Dec. 12, 1944.     T. H. SLOAN     2,365,116
CHUCK FOR MACHINE TOOLS
Filed June 10, 1943     2 Sheets-Sheet 1
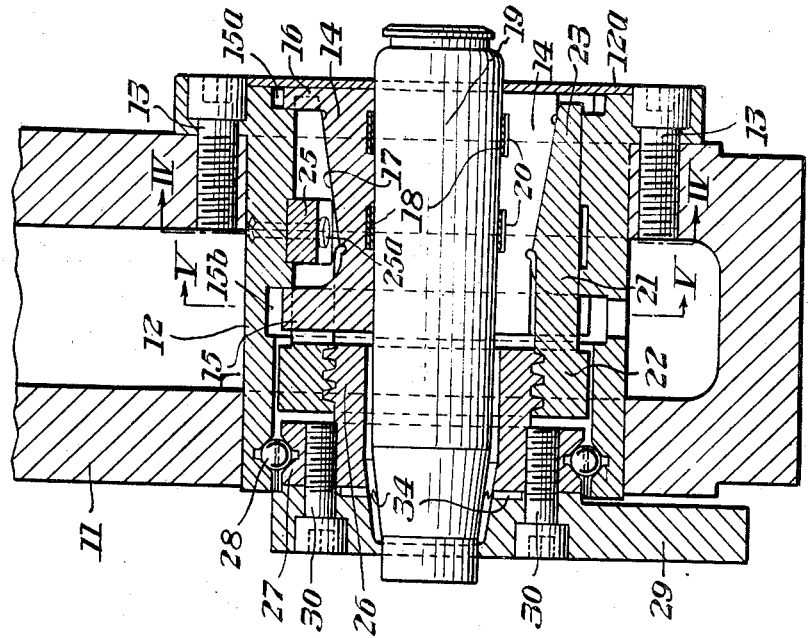
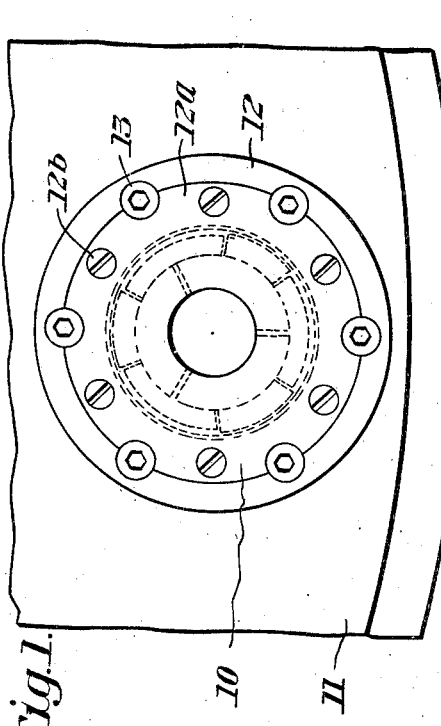
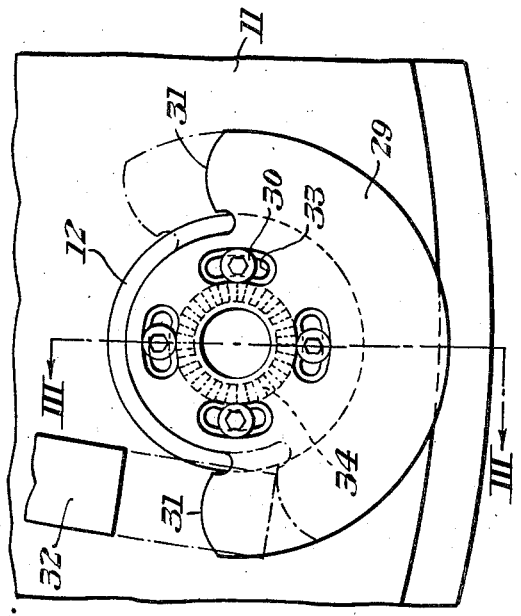
INVENTOR
Theodore H. Sloan
by his attorneys
Stebbins and Blenko

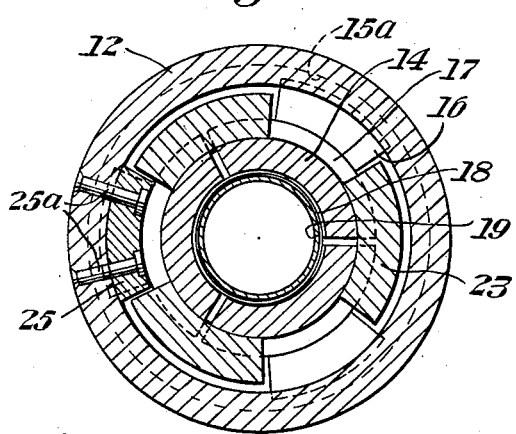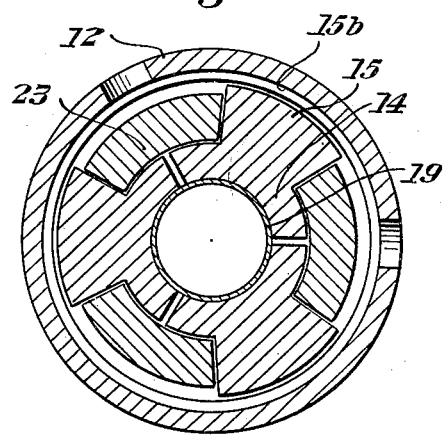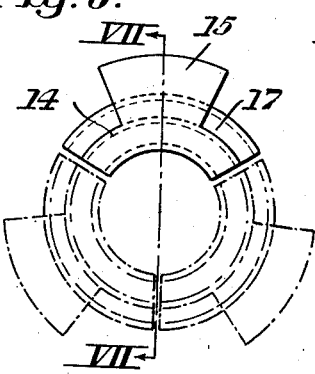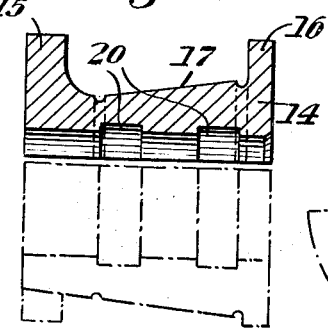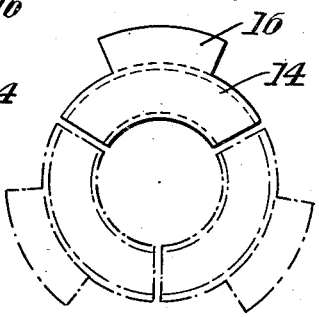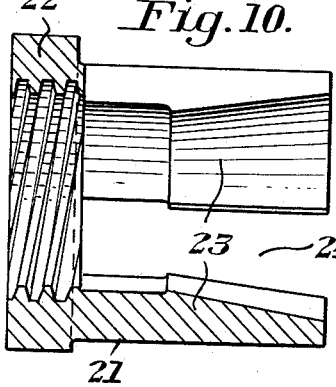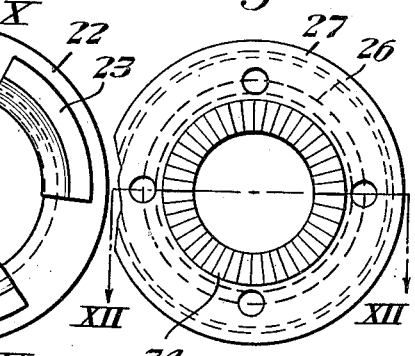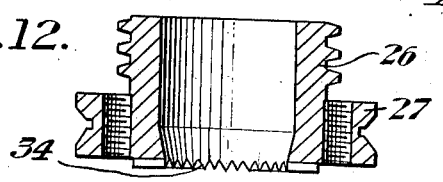

Patented Dec. 12, 1944

2,365,116

UNITED STATES PATENT OFFICE 2,365,116

CHUCK FOR MACHINE TOOLS

Theodore H. Sloan, Pittsburgh, Pa., assignor to G. M. S. Corporation, Pittsburgh, Pa., a corporation of Pennsylvania Application June 10, 1943, Serial No. 490,294

7 Claims. (Cl. 279—57)

This invention relates to a chuck and, in particular, to a chuck of the tapered collet type for securing relatively small workpieces while being engaged by a machine tool or a succession thereof.

Collet chucks as heretofore constructed have generally included a continuous sleeve enclosing a collet, the sleeve and collet having cooperating frusto-conical surfaces, the sleeve being disposed in a cylindrical housing. The collet is slotted from one end and the segments between slots are contracted by axial movement of the sleeve but any clearance between the sleeve and housing permits movement of the sleeve, collet, and the article gripped therein, resulting in faulty machining and possible rejection of the piece.

I have invented a novel form of collet chuck which overcomes the aforementioned objection to chucks of this type as previously known and provides a rigid positioning of the sleeve in its housing when the chuck grips a workpiece, thus preventing any possibility of movement of the latter during machining. In a preferred embodiment, my chuck comprises a plurality of collet segments enclosed by a sleeve having slots extending thereinto from one end, the cooperating surfaces of the segments and sleeve being frusto-conical. The sleeve is enclosed in a housing and is provided with screw-type actuating means for moving it axially. When the chuck is operated to grip a workpiece, the collet segments are contracted about the piece and, at the same time, the spaced portions of the sleeve formed by the slots therein are expanded against the housing, thereby locking the entire assembly firmly in position.

A complete understanding of the invention may be obtained by considering the accompanying drawings illustrating the preferred embodiment, and the following detailed description and explanation. In the drawings, Figure 1 is an elevation showing one face of my chuck;

Figure 2 is an elevation showing the other face;

Figure 3 is an axial section taken along the plane of line III—III of Figure 2;

Figures 4 and 5 are transverse sections taken along the planes of lines IV—IV and V—V of Figure 3, respectively;

Figure 6 is an end elevation of a collet segment, the remaining segments of the group being shown associated therewith, in chain lines;

Figure 7 is an axial section through a collet segment taken along the plane of line VII—VII of Figure 6;

Figure 8 is a view similar to Figure 6 showing the other end of the segment;

Figure 9 is an end elevation of the collet sleeve;

Figure 10 is an axial section therethrough taken on the plane of line X—X of Figure 9;

Figure 11 is an elevation of the screw for actuating the sleeve; and

Figure 12 is an axial section therethrough taken along the plane of line XII—XII of Figure 11.

Referring now in detail to the drawings, my chuck indicated generally at 10 may be mounted on any convenient support. In a specific application thereof, I mount a plurality of chucks on a rotary head 11 adapted to move step by step so as to bring the chucks successively to a loading position, a plurality of machining positions and an unloading position. My chuck is equally adapted, however, for mounting on a fixed support. In any event, the several parts of the chuck are enclosed in a housing 12 having a cylindrical bore therethrough, secured to the head 11 by screws 13. A cover plate 12a is secured to one end of the housing by screws 12b. Collet segments 14 are disposed within the housing 12 and have lugs 15 and 16 at their opposite ends engaging stepped portions 15a and 15b in the bore thereof to prevent axial movement while permitting limited radial movement. The collet segments have a frusto-conical exterior surface 17 between their lugs 15 and 16. Spiral springs 18 of flat ribbon stock tend to urge the segments 14 outwardly.

As clearly shown in Figures 6 through 8, there are three collet segments 14 in the particular design of chuck disclosed herein although a greater number may be employed. The central angle subtended by each segment is therefore approximately 120°. The lugs 15 and 16, however, do not extend circumferentially over the full arc of the segments but subtend a smaller angle, e. g., about 50°. The interior surfaces of the segments provide jaws adapted to grip the exterior of a workpiece such as a shell case 19, and are grooved at 20 to accommodate the springs 18.

A collet sleeve 21, as shown in Figures 9 and 10, comprises a continuous ring or nut 22 having circumferentially spaced segments 23 extending axially thereof, the spaces or slots between the segments being designated 24. The inner surfaces of the segments 23 are frusto-conical in shape and adapted to conform to the outer surfaces of the collet segments 14. The width of the segments 23 measured circumferentially therealong is such as to permit them to pass between the lugs 15 and 16 of adjacent collet segments 14. When assembled in mating relation, as shown in Figures 4 and 5, the slots 24 or spaces between the segments 23 accommodate the lugs 15 and 16 on the collet segments. It will be apparent from Figure 3 that axial movement of the sleeve 21 to the right will contract the segments 14 about the workpiece 19. At the same time, the segments 23 will be expanded against the interior of the housing 12. A guide block 25 is secured on the interior of the housing by rivets 25a, in line with the lugs of one of the segments 14 so as to clear the segments 23 of the sleeve. The block 25 permits axial movement of the sleeve 21 but prevents rotation thereof in the housing 12.

The means for actuating the sleeve 21 axially in the housing 12 is a screw 26 cooperating with the continuous ring or nut 22, the interior of which is threaded as shown in Figure 10. The screw has an outwardly extending flange 27. The periphery of the flange 27 and the interior of the housing 12 adjacent thereto are machined to accommodate a combined radial and thrust bearing 28. It will be readily apparent that rotation of the screw 26 will cause the sleeve 21 to be shifted toward the right or left, as shown in Figure 3, dependent on the direction of rotation of the screw. Any convenient means may be provided for rotating the screw. A suitable handle may be secured thereto for manual operation, if desired. In the illustrated embodiment, however, I have shown a plate 29 secured to the flange 27 by screws 30 and having rounded surfaces 31 in substantially diametrically opposite positions, adapted to be engaged by the piston rod 32 of a pneumatic cylinder (not shown) mounted on a fixed support and adapted to engage successively the operating plates of the several chucks mounted on the support 11 when in loading and unloading positions. The piston rod 32 shown in Figure 2 is located so as to cooperate with the plate 29 in the unloading position. A similar cylinder and piston rod are positioned to engage the opposite bearing surface 31 in the loading position. As shown in Figure 2, the plate 29 has arcuate slots 33 to receive the screws 30 whereby the plate may be adjusted angularly on the screw 26. The engaging surfaces of the plate and screw are toothed as at 34 to prevent slippage therebetween when the proper adjustment has been made and the screws 30 tightened.

It will be apparent from the foregoing description that movement of the plate 29 in one direction, e. g., clockwise, will cause the sleeve 21 to be moved to the right as shown in Figure 3, thereby contracting the segments 14 about the workpiece 19. Similarly, movement of the plate 29 in the opposite direction will cause retraction of the sleeve 21, thereby permitting expansion of the segments 14 under the force exerted by the springs 18 whereupon the workpiece 19 may be readily removed. The operation of the chuck is thus rapid and positive. The segments 14 have radial movement only while the sleeve 21 has axial movement only. The contraction of the segments 14 about the workpiece is accompanied by an expansion of the segments 23 of the sleeve 21 sufficient to take up any clearance between the sleeve and the housing 12, thereby providing solid engagement of all cooperating parts from the housing to the workpiece and thus preventing any shifting of the latter as a result of working clearances.

The invention is characterized by numerous advantages in addition to that already referred to. In the first place, the screw 26 may be provided with a multiple thread so that only a limited angular movement thereof, say 90°, is required to produce the full axial movement of the sleeve. When the chuck has been actuated to grip the workpiece, it is self-locking because of the low pitch of the threads on the actuating screw. Each of the collet segments is engaged by two segments of the sleeve, thereby insuring equalization of pressure on the workpiece. The use of three collet segments produces self-centering of the workpiece in response to a radial movement of the segments. Heavy gripping pressures may be obtained because of the large mechanical advantage of the screw and the wedge effect produced by the sleeve and segments. The segments are self-opening by reason of the spiral springs engaging the interior thereof.

The use of a pneumatic cylinder to operate the rotary plate 29 insures that equal pressure is applied to all workpieces despite slight variations in diameter, that is to say, the pressure applied to the cylinder being predetermined, only a definite pressure will be applied to the workpiece, regardless of whether it is undersized or oversized, since the only limit to the contraction of the chuck segments or jaws is the resistance opposed thereto by the workpiece itself.

As already indicated, the chuck may readily be adapted to existing machines provided with manual or automatically operated chucking and the chuck may be made as a unit for stationary mounting as well as mounting on a rotating support as herein disclosed.

Although I have illustrated and described herein but a preferred embodiment of the invention, it will be recognized that changes in the design and arrangement of the parts may be made without departing from the spirit of the invention or the scope of the appended claims.

I claim:

1. A chuck comprising a housing having a cylindrical bore, a plurality of collet segments disposed in said bore having outwardly extending lugs cooperating with the housing to prevent movement of the segments longitudinally thereof, the outer surfaces of said segments being frusto-conical in shape, and a collet sleeve having a nut co-axial therewith at one end, a frusto-conical interior surface embracing said segments and a cylindrical outer surface slidable in said bore, a screw extending into said nut, and a thrust bearing carried by said housing, said screw being rotatable on said bearing.

2. The apparatus defined by claim 1 characterized by said sleeve having circumferentially spaced slots to pass said lugs.

3. The apparatus defined by claim 1 characterized by said sleeve having circumferentially spaced slots to pass said lugs and a guide-block secured in said bore engaging the sides of one of said slots to prevent rotation of said sleeve.

4. A chuck comprisng a housing having a cylindrical bore, a plurality of collet segments disposed in said bore, cooperating means on said segments and housing preventing longitudinal movement of the former in the latter, the outer surfaces of said segments being frusto-conical in shape, and a collet sleeve having a nut co-axial therewith at one end, a frusto-conical interior surface embracing said segments and a cylindrical outer surface slidable in said bore, a screw extending into said nut, and a thrust bearing carried by said housing, said screw being rotatable on said bearing.

5. A chuck comprising a housing having a cylindrical bore, a plurality of collet segments disposed in said bore, lugs extending radially from the segments to the housing for preventing movement of the segments axially of the bore but leaving them free for radial movement therein, the outer surfaces of the segments being frusto-conical in shape, and a sleeve having slots extending longitudinally from one end thereof, of a width to accommodate said lugs, said sleeve having a frusto-conical interior surface embracing said segments and a cylindrical outer surface slidable in said bore, and means for effecting axial movement of said sleeve in said bore including a nut at the other end of said sleeve, a screw cooperating therewith and a thrust bearing for said screw on said housing.

6. A chuck comprising a housing having a cylindrical bore, a plurality of collet segments disposed in said bore, means preventing movement of the segments axially of the bore but leaving them free for radial movement therein, the outer surfaces of the segments being frusto-conical in shape, and a sleeve slotted longitudinally from one end thereof, having a frusto-conical interior surface embracing said segments and a cylindrical outer surface slidable in said bore, means for effecting axial movement of said sleeve in said bore whereby to contract said segments and expand the circumferentially spaced portions of the sleeve at the slotted end thereof, and a guide block secured in said bore and adapted to enter one of the slots in said sleeve to prevent rotation of the sleeve in said housing.

7. A chuck comprising a housing having a cylindrical bore therethrough, a plurality of collet segments disposed therein having frusto-conical exterior surfaces, said segments each having a lug extending radially outward for cooperation with the housing to prevent movement of the segments longitudinally thereof, a collet sleeve having a frusto-conical interior surface embracing said segments, said sleeve having longitudinal slots extending thereinto from one end, of a width to accommodate said lugs, and cooperating screw means on said sleeve and housing for shifting the sleeve longitudinally of the housing.

THEODORE H. SLOAN.